United States Patent Office 3,493,392
Patented Feb. 3, 1970

3,493,392
TUNA PROCESSING
William E. Swartz, McKeesport, Pa., assignor to Calgon Corporation, a corporation of Pennsylvania
No Drawing. Continuation-in-part of application Ser. No. 617,474, Feb. 21, 1967. This application Jan. 29, 1969, Ser. No. 795,056
Int. Cl. A23l 1/325
U.S. Cl. 99—111    9 Claims

ABSTRACT OF THE DISCLOSURE

This invention relates to a process for increasing the yield of white and light meat, improving the flavor, odor and general taste of tuna by treating the flesh of previously frozen tuna prior to cooking with a molecularly dehydrated phosphate such as sodium tripolyphosphate or an orthophosphate.

---

This is a continuation-in-part of my copending application, Ser. No. 617,474, filed Feb. 21, 1967 now abandoned.

This invention relates to tuna processing and particularly to a method of treating tuna to improve the yield, taste and texture of white and light meat.

Tuna, which is derived from the broad group of fish generally called tuna, albacore, skipjack, tunny and kawakawa and defined more specifically in the Standard of Identity of the Food and Drug Administration, is a highly prized fish of generally high oil content. In general, the white and light meat of tuna is canned and sold for human consumption, while the dark portion of the tuna is sold as cat food or otherwise used in animal food mixtures. Obviously, it is highly desirable to be able to increase the yield of white and light meat because of the high price it commands as human food.

I have found, surprisingly, that, if tuna is pumped with a solution of molecularly dehydrated phosphates or an orthophosphate alone or in admixture with salt, the yield of white and light meat can be increased as much as 15% or more as compared to the yield of untreated tuna where the cooking is carried out in steam alone. In addition to the increased yield of white and light meat, the flavor and odor are more delicate, being less "fishy." Moreover, the cooked meat is more tender and less dry in the treated as compared to untreated tuna.

Preferably, I pump a solution of salt and molecularly dehydrated phosphate, such as sodium tripolyphosphate or mixtures of sodium tripolyphosphate and sodium hexametaphosphate, or sodium pyrophosphate or a solution of sodium orthophosphate into the thawed flesh of the tuna before cooking to provide a level of about 0.5% added phosphate in the flesh and thereafter, I cook the tuna as usual and remove the meat in the usual manner. While I prefer to use a solution of salt and phosphate, I have found that the phosphate alone will also provide marked improvement in yield of white and light meat as well as in flavor and odor, although not to the degree generally achieved by the salt-phosphate mixture. The level of phosphate addition should preferably be between 0.1% and 1.0%.

The invention is peculiarly advantageous in its effect on white and light meat yield. I do not propose to attempt an explanation of this peculiar advantage but simply point out that it is a very surprising but extremely important commercial advantage.

The invention will perhaps be better understood by reference to the following examples.

EXAMPLE I

Two whole albacore, weighing approximately 17 and 19 pounds respectively, were used. After thawing, they were eviscerated and the gills and head were removed. One received no treatment. The other was injected through the skin with a 5% solution of sodium tripolyphosphate using a large hypodermic needle to provide a level of about 0.4% phosphate in the meat. After holding for one hour at room temperature, they were cooked together in the autoclave. A temperature of 220° F. and pressure corresponding to such temperature in the autoclave was reached in 30 minutes and this temperature was maintained for 1½ hours. The internal temperature of the meat at the end of the cook period was 168° to 170° F. After cooling in air at room temperature for two hours, they were covered and refrigerated overnight. The following day the cooked weights were taken and the white and light meat was separated and weighed. Yield data are shown in Table I as follows:

TABLE I

| Treatment | Cooked yield based on initial, weight, percent | White or light meat yield based on initial weight, percent | Added phosphate as tri-poly, percent |
|---|---|---|---|
| Control, none | 71.0 | 47.7 | |
| Treated pumped, 8% of 5% tripoly | 77.1 | 50.8 | 0.42 |

The yields are calculated on the basis of the thawed uneviscerated weights. The added phosphate is calculated from an analysis of the cooked white or light meat.

The treated meat was definitely superior to the untreated in odor, flavor and texture.

Portions of the cooked meat were packed tightly into two-ounce screw capped jars. These were cooked by placing in a preheated autoclave and raising the temperature to 240° F. as if the cooked meat were canned. This required 15 minutes. After cooling to approximately room temperature, no cooked-out juice could be obtained from either sample. If anything, the cooked meat was drier than it was before cooking.

EXAMPLE II

Four frozen albacore were obtained with heads and tails removed. Fish #3 was allowed to thaw in the refrigerator at 36 to 38° F. over a weekend. The others were thawed overnight in running cold water. They were gutted, definned, split longitudinally and the backbones were removed. The treatments were applied by pumping through the flesh side with a dual stitch pumping needle. After draining for 1 hour to 1¼ hours, the sides were re-weighed to determine the effective percent pump. They were then tied in the manner of a rolled roast in order to reduce exposure of the flesh and the two sides from the same fish were cooked in the autoclave for one hour at 220° F. Internal temperatures obtained varied from 175 to 190° F. between the different cooks. After cooking, they were allowed to cool for 2 to 2½ hours at room temperature and were then covered and chilled overnight. The following day gross weights were obtained and the white or light meat was separated and weighed.

Treatment and yield data are shown in Table II. In comparing sides of the same fish, the results indicate that tripoly-salt is superior to either tripoly or salt alone.

Table III shows the white or light meat yield increases obtained by taking the lower yield value of each set as 100.

TABLE II

| Treatment | Effective percent pump | Percent cooked yield gross white or light meat | | TBA value | Days after cook |
|---|---|---|---|---|---|
| Fish #1: | | | | | |
| Side 1—None | 0 | 74.6 | 59.4 | 0.6 | 1 |
| | | | | 3.4 | 7 |
| Side 2—Tripoly, 50 gms./liter | 9.2 | 82.6 | 67.0 | 0.6 | 1 |
| | | | | 4.1 | 7 |
| Fish #2: | | | | | |
| Side 1—Tripoly, 50 gms./liter | 9.3 | 83.6 | 68.5 | 1.0 | 6 |
| Side 2—Tripoly, 50 gms./liter; salt, 120 gms./liter | 12.3 | 86.6 | 71.5 | 1.4 | 6 |
| Fish #3: | | | | | |
| Side 1—Salt, 120 gms./liter | 8.6 | 85.4 | 70.8 | | |
| Side 2—Tripoly, 50 gms./liter; salt, 120 gms./liter | 7.6 | 88.7 | 72.5 | 1.3 | 2 |
| Fish #4: | | | | | |
| Side 1—Water pumped | 1.4 | 74.3 | 54.2 | 6.0 | 1 |
| Side 2—Tripoly, 50 gms./liter; salt, 120 gms./liter | 9.3 | 89.0 | 71.5 | 1.8 | 1 |

TABLE III

| Treatment | | White or light meat yield |
|---|---|---|
| Fish #1: | | |
| Side 1 | None | 100 |
| Side 2 | Tripoly | 112.8 |
| Fish #2: | | |
| Side 1 | Tripoly | 100 |
| Side 2 | Tripoly-salt | 104.4 |
| Fish #3: | | |
| Side 1 | Salt | 100 |
| Side 2 | Tripoly-salt | 102.4 |
| Fish #4: | | |
| Side 1 | Water | 100 |
| Side 2 | Tripoly-salt | 132.0 |

EXAMPLE III

Tuna flesh was ground and treated with various molecularly dehydrated phosphates prior to cooking. A 0.5% by weight level of the phosphates was used. The yield data is tabulated in Table IV.

TABLE IV

| | Set 1, percent yield | Set 2, percent yield | Weighted Avg., percent yield |
|---|---|---|---|
| Hexametaphosphate | 115 | 114 | 114.5 |
| Disodium orthophosphate | 113 | 113 | 113 |
| Monosodium orthophosphate | 114 | 111 | 112.5 |
| Normal pyrophosphate | 116 | 116 | 116 |
| Acid pyrophosphate | 111 | 109 | 110 |

EXAMPLE IV

Forty whole frozen skipjack of approximately the same size were selected, thawed, gutted and separated into three groups of twelve, twelve, and sixteen each. One group was stitch pumped with a sodium tripolyphosphate solution to a level of 0.31% calculated residual phosphate, the second group was stitch pumped with a solution of sodium tripolyphosphate and salt to the level of 0.34% calculated residual phosphate and 0.80% salt. The third group was taken as a control. All fish were then cooked in an autoclave to an internal temperature of about 180° F. After cooking, the fish were cooled, weighed and the light meat separated and weighed. The results showed an increased light meat yield over the control where sodium tripolyphosphate alone was used of 14.2% and where sodium tripolyphosphate and salt were used together of 14.4%.

EXAMPLE V

Thirty-six yellowfin tuna were treated as in Example IV except that in the case of sodium tripolyphosphate alone the calculated residual phosphate was at a level of 0.50% and in the case of sodium tripolyphosphate and salt, the calculated residual phosphate was 0.50% and salt was 1.25%. The results showed an increased light meat recovery in the case of the phosphate alone of 5.6% and in the mixture of phosphate and salt of 12.7%.

It will be seen from the foregoing examples that the addition of molecularly dehydrated phosphate and/or orthophosphate and mixtures thereof with salt showed marked improvement in white or light meat yields over tuna cooked without treatment.

The TBA values are indicative of the oxidation or rancidity development of the oils in the fish. The rancidification of the oil causes the fish to give off an undesirably fishy odor and to develop a strong taste. This tendency is markedly reduced by my treatment, resulting in more delicate odor and taste as well as better keeping qualities.

While I have illustrated and described certain preferred practices of my invention in the foregoing specification, it is to be understood that this invention may be otherwise embodied within the scope of the following claims.

I claim:

1. The method of treating frozen tuna to provide greater yields of subsequently cooked white or light meat which comprises the step of pumping into said tuna flesh after thawing and prior to cooking at least 0.1% by weight of a phosphate selected from the group consisting of molecularly dehydrated phosphates and orthophosphates.

2. The method of treating tuna as claimed in claim 1 wherein the molecularly dehydrated phosphate is incorporated into said tuna by pumping an aqueous solution of said phosphate and salt into the fish.

3. The method of treating tuna as claimed in claim 2 wherein the phosphate is a molecularly dehydrated phosphate.

4. The method of treating tuna as claimed in claim 2 wherein the phosphate is one or more of the group consisting of sodium tripolyphosphate and sodium hexametaphosphate.

5. The method of treating tuna as claimed in claim 2 wherein the phosphate is one or more of the group consisting of sodium orthophosphate and sodium pyrophosphate.

6. The method of treating tuna as claimed in claim 2 wherein phosphate in an amount between about 0.1% to 1.0% is incorporated in the tuna prior to cooking.

7. The method of treating tuna as claimed in claim 2 wherein the phosphate comprises a major portion of sodium tripolyphosphate.

8. The method of treating tuna as claimed in claim 2 wherein the phosphate comprises a major portion of sodium hexametaphosphate.

9. The method of treating tuna as claimed in claim 2 wherein the phosphate is a mixture of sodium tripolyphosphate and sodium orthophosphate.

References Cited

UNITED STATES PATENTS

| 2,555,236 | 5/1951 | Kreidl et al. | 99—188 |
| 3,036,923 | 5/1962 | Mahon | 99—195 |
| 3,104,170 | 9/1963 | Mahon | 99—107 |
| 3,207,608 | 9/1965 | Brown et al. | 99—107 |

RAYMOND N. JONES, Primary Examiner

S. B. DAVIS, Assistant Examiner